(12) United States Patent
Savino et al.

(10) Patent No.: US 10,958,720 B2
(45) Date of Patent: Mar. 23, 2021

(54) METHODS, APPARATUSES AND SYSTEMS FOR CLOUD BASED DISASTER RECOVERY

(71) Applicant: Storage Engine, Inc., Tinton Falls, NJ (US)

(72) Inventors: Trevor Savino, Seymour, CT (US); James Patrick Hart, Brick, NJ (US); Justin Furniss, Egg Harbor City, NJ (US); Charles Wooley, Sea Girt, NJ (US)

(73) Assignee: Storage Engine, Inc., Tinton Falls, NJ (US)

( * ) Notice: Subject to any disclaimer, the term of this patent is extended or adjusted under 35 U.S.C. 154(b) by 167 days.

(21) Appl. No.: 16/224,087

(22) Filed: Dec. 18, 2018

(65) Prior Publication Data

US 2020/0195713 A1    Jun. 18, 2020

(51) Int. Cl.
| | | |
|---|---|---|
| *H04L 29/14* | (2006.01) | |
| *G06F 11/14* | (2006.01) | |
| *H04L 29/08* | (2006.01) | |
| *G06F 9/50* | (2006.01) | |
| *H04L 29/06* | (2006.01) | |
| *H04L 12/24* | (2006.01) | |

(52) U.S. Cl.
CPC ........ *H04L 67/1034* (2013.01); *G06F 9/5061* (2013.01); *G06F 11/1464* (2013.01); *G06F 11/1469* (2013.01); *H04L 41/22* (2013.01); *H04L 63/10* (2013.01); *H04L 69/40* (2013.01); *G06F 2209/505* (2013.01)

(58) Field of Classification Search
CPC ............. G06F 11/2023; G06F 11/2025; G06F 11/203; G06F 11/2002; G06F 11/1464; H04L 67/1034
See application file for complete search history.

(56) References Cited

U.S. PATENT DOCUMENTS

| | | |
|---|---|---|
| 7,321,918 B2 | 1/2008 | Burd et al. |
| 8,065,559 B2 | 11/2011 | Kamath et al. |
| 8,387,114 B2 | 2/2013 | Sugarbroad |
| 8,812,904 B2 | 8/2014 | Kamath et al. |

(Continued)

FOREIGN PATENT DOCUMENTS

| | | |
|---|---|---|
| CN | 101309167 A | 11/2008 |
| CN | 201479165 U | 5/2010 |

(Continued)

OTHER PUBLICATIONS

Stankovic "What is a Sql Server disaster recovery?", SQLShack, Mar. 14, 2014.

(Continued)

*Primary Examiner* — Gabriel Chu
*Assistant Examiner* — Kurosu Risa Altaf
(74) *Attorney, Agent, or Firm* — Moser Taboada

(57) ABSTRACT

Methods, apparatuses and systems for cloud-based disaster recovery are provided. The method, for example, includes configuring, at a cloud-based computing platform, a workload associated with a function-based service used by a client machine; determining, at the cloud-based computing platform, servers associated with the workload based on information provided by a user; generating steps for the workload; categorizing the determined servers into the generated steps; storing the workload; and restoring the servers using the stored workload upon receiving a failure indication from the client machine.

18 Claims, 6 Drawing Sheets

(56) References Cited

U.S. PATENT DOCUMENTS

| | | |
|---|---|---|
| 8,909,977 B2 | 12/2014 | Morosan et al. |
| 9,300,633 B2 | 3/2016 | Acharya et al. |
| 9,336,103 B1 | 5/2016 | Hasbe et al. |
| 9,501,361 B2 | 11/2016 | Klein |
| 9,525,592 B2 | 12/2016 | Tung |
| 9,575,798 B2 | 2/2017 | Terayama et al. |
| 9,894,098 B2 | 2/2018 | Sabin |
| 9,934,054 B2 | 4/2018 | Baset et al. |
| 2005/0193245 A1* | 9/2005 | Hayden ............... G06F 11/2069 714/13 |
| 2010/0293147 A1 | 11/2010 | Snow et al. |
| 2013/0103834 A1 | 4/2013 | Dzerve et al. |
| 2014/0245423 A1 | 8/2014 | Lee |
| 2014/0289797 A1 | 9/2014 | Trani |
| 2015/0229638 A1 | 8/2015 | Loo |
| 2016/0117231 A1 | 4/2016 | Lee et al. |
| 2016/0162378 A1* | 6/2016 | Garlapati ............ G06F 11/2038 714/4.12 |
| 2017/0099188 A1 | 4/2017 | Chang et al. |
| 2017/0149585 A1 | 5/2017 | Norris et al. |
| 2017/0249221 A1* | 8/2017 | Jain ..................... G06F 11/1662 |
| 2018/0198754 A1 | 7/2018 | Kielhofner et al. |

FOREIGN PATENT DOCUMENTS

| | | |
|---|---|---|
| CN | 102932407 A | 2/2013 |
| CN | 104767643 A | 7/2015 |
| CN | 106982259 A | 7/2017 |
| CN | 108234191 A | 6/2018 |
| CN | 108632057 A | 10/2018 |
| EP | 2251783 A1 | 11/2010 |
| JP | 2012068771 A | 4/2012 |
| KR | 20150121891 A | 10/2015 |
| WO | WO-2007111086 A1 | 10/2007 |
| WO | WO-2015109804 A1 | 7/2015 |
| WO | WO-2017161979 A1 | 9/2017 |

OTHER PUBLICATIONS

Alcantara et al "GINJA: One-dollar Cloud-based Disaster Recovery for Databases", Middleware '17, Dec. 11-15, 2017, Las Vegas, NV, USA.

"Acronis® Disaster Recovery as a Service", Acronis, Downloaded from web site http://dl.acronis.com/u/pdf/Acronis-DRaaS_datasheet_en-US.pdf.

* cited by examiner

METHODS, APPARATUSES AND SYSTEMS FOR CLOUD BASED DISASTER RECOVERY

FIELD

The disclosure generally relates to methods, apparatuses and systems for cloud-based disaster recovery, and more particularly, to methods, apparatuses and systems for managing backup solutions for data backup and recovery of servers.

BACKGROUND

Client workstations within an organization's work facilities use one or more servers to perform various operations associated with the organization. Data on a server can be backed up using one or more backup solutions provided by a backup vendor associated with the server, so that if that server should become inoperable, e.g., crash, become corrupted, or destroyed, the server can be restored to a point in time in a relatively quick manner. Additionally, restoring a server sometimes requires manual/user intervention, which can be quite challenging and/or time consuming for a user in view of the complexity of the backup solutions. As can be appreciated, the more servers that become inoperable, the more time it will take to restore them, as each server has its own unique backup solution.

Accordingly, there is a need for methods, apparatuses and systems for managing backup solutions for data backup and recovery of servers.

SUMMARY

Methods, apparatuses and systems for managing backup solutions for data backup and recovery of servers are disclosed herein.

In accordance with an aspect of the disclosure, there is provided a method for cloud-based disaster recovery. The method includes configuring, at a cloud-based computing platform, a workload associated with a function-based service used by a client machine; determining, at the cloud-based computing platform, servers associated with the workload based on information provided by a user; generating steps for the workload; categorizing the determined servers into the generated steps; storing the workload; and restoring the servers using the stored workload upon receiving a failure indication from the client machine.

In accordance with an aspect of the disclosure, there is provided a nontransitory computer readable storage medium having stored thereon instructions that when executed by a processor perform a method for cloud-based disaster recovery. The method includes configuring, at a cloud-based computing platform, a workload associated with a function-based service used by a client machine; determining, at the cloud-based computing platform, servers associated with the workload based on information provided by a user; generating steps for the workload; categorizing the determined servers into the generated steps; storing the workload; and restoring the servers using the stored workload upon receiving a failure indication from the client machine.

In accordance with an aspect of the disclosure, there is provided a cloud-based server of a cloud-based computing platform. The cloud-based server includes a processor and a memory coupled to the processor and having stored thereon instructions that when executed by the processor configure the cloud-based server to configure, at a cloud-based computing platform, a workload associated with a function-based service used by a client machine; determine, at the cloud-based computing platform, servers associated with the workload based on information provided by a user; generate steps for the workload; categorize the determined servers into the generated steps; store the workload; and restore the servers using the stored workload upon receiving a failure indication from the client machine.

BRIEF DESCRIPTION OF THE DRAWINGS

The above and other aspects, features and advantages of certain embodiments of the disclosure will be more apparent from the following detailed description taken in conjunction with the accompanying drawings, in which.

Figure 1:
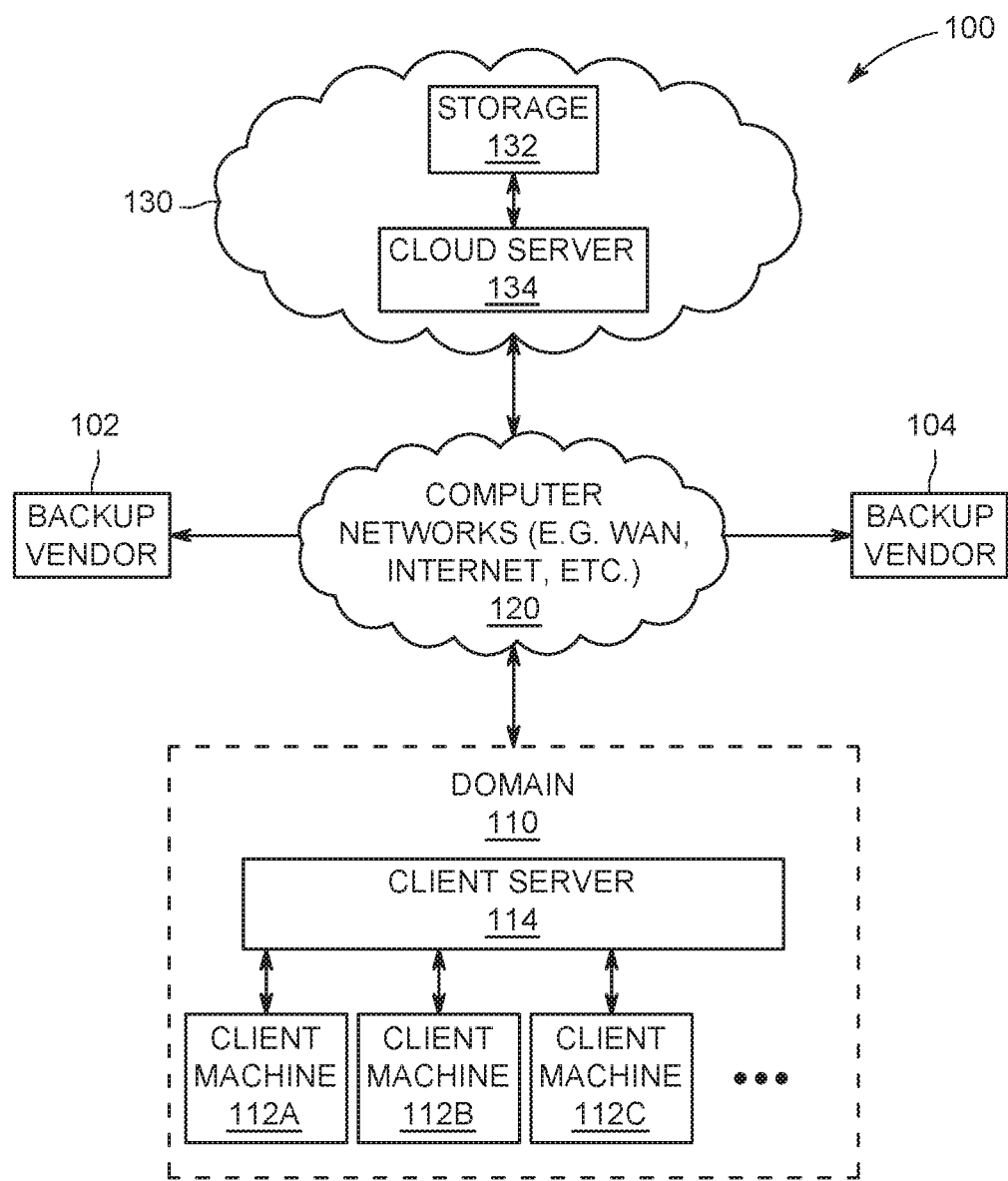
FIG. 1 is a diagram of a cloud-based disaster recovery system that uses a web-based application, in accordance with an embodiment of the disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the disclosure. In the description of the drawings, similar reference numerals are used for similar elements.

A backup, or the process of backing up, can refer to the copying and/or archiving of computer data so the copied data can be used to restore the original after a data loss event. Backup solution refers to a solution used by a backup vendor. Backup set refers to multiple backups.

Cloud computing can refer to computing that can involve a large number of computers connected through a communication network such as the Internet. Cloud computing can be a form of distributed computing over a network, and can include the ability to run a program or application (e.g., a web application) on many connected computers at the same time.

Cloud storage can refer to a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Disaster Recovery as a service (DRaaS) can refer to the use of physical machines, virtual machines, and/or other resources to perform disaster recovery offered with a cloud-service model.

Virtual machine (VM) can refer to a software-based emulation of a computer. Virtual machines can operate based on the computer architecture and functions of a computer.

Workload as used herein can refer to groups of machines including, for example, servers, networks, firewalls, etc., and all other devices and interconnections between the groups of machines of a client site or sites. For example, a workload can include servers that must be running for a corresponding business function (e.g., web-based application service, accounting services, sales systems, public website, etc.) to be available at the client site. Servers can be organized within a workload in groups called workload steps which allow a user (e.g., a creator of the workload) to specify when an order of servers being restored is important.

FIG. 1 is a diagram of a cloud-based disaster recovery system 100 (system 100) that uses a web-based application, in accordance with an embodiment of the disclosure. The system 100 can provide DRaaS and can be used for data backup and recovery of servers used by client workstations, e.g., for cloud-based recovery of the servers in the event of a disaster.

The system 100 includes a client domain 110, at least one computer network 120 and a cloud-based computing platform 130. The client domain 110 includes at least one client machine/device 112A-112O (hereinafter collectively referred to as client machines 112) and an onsite client server 114, which partitions tasks or workloads between the client machines 112 and one or more service providers, i.e., servers.

The cloud-based computing platform 130 includes a cloud-based storage device 132 (storage 132) and at least one cloud-based server 134 (cloud server 134). The cloud-based computing platform may also include a virtual machine representing virtualized client workloads. The cloud-based computing platform 130 communicates with the client domain 110 via a computer network 120, which can be a wide-area network (WAN), an Internet and other networks implemented for communication by the client domain 110; a more detailed description of the computer network 120 is described below. In addition, while the storage 132 is illustrated as a single, physical device, the storage 132 can span multiple servers and can be accessed by clients over the internet.

The client domain 110 including the client machines 112 can represent a client workload including servers, networks, firewalls, etc., and all other machines and interconnections of a client domain or domains 110.

A client in the client domain 110 can interact via a user interface of the client server 114 through the computer network 120 with a web-based application and executed via, for example, the cloud server 134 of the cloud-based computing platform 130.

For example, a web-based application as described herein can be used at the cloud server 134 to manage backup information (e.g., backup solutions, backups, backup sets, etc.) provided by one or more backup vendors 102, 104, which are used locally by the client machines 112 at the client domain 110. The backup vendors 102, 104, using the backup information, are configured to restore one or more respective servers 102a, 104a. The backup information can also include other information (e.g., information relating to a previous restore of a server) associated with the backup vendors 102, 104 and/or the servers 102a, 104a. Thus, if the servers 102a, 104a become inoperable, e.g., crash, become corrupted, or destroyed, backup sets stored and managed at/by the cloud server 134 can be used to restore the inoperable servers 102a, 104a back to an original or operable environment. The backup vendors 102, 104 can be products of, for example, Dell EMC, Google, Veritas, Commvault, IBM, etc. While two backup vendors 102, 104 are shown in the FIGS., more or fewer backup vendors 102, 104 can be used by the client machines 112. Similarly, while the servers 102a, 104a are described herein as single servers, users can create workloads comprised of many single servers (e.g. web server, database server, file server, etc.) to represent high level services (e.g. accounting services, sales systems, public website, etc.), as described in greater detail below.

Figure 2:
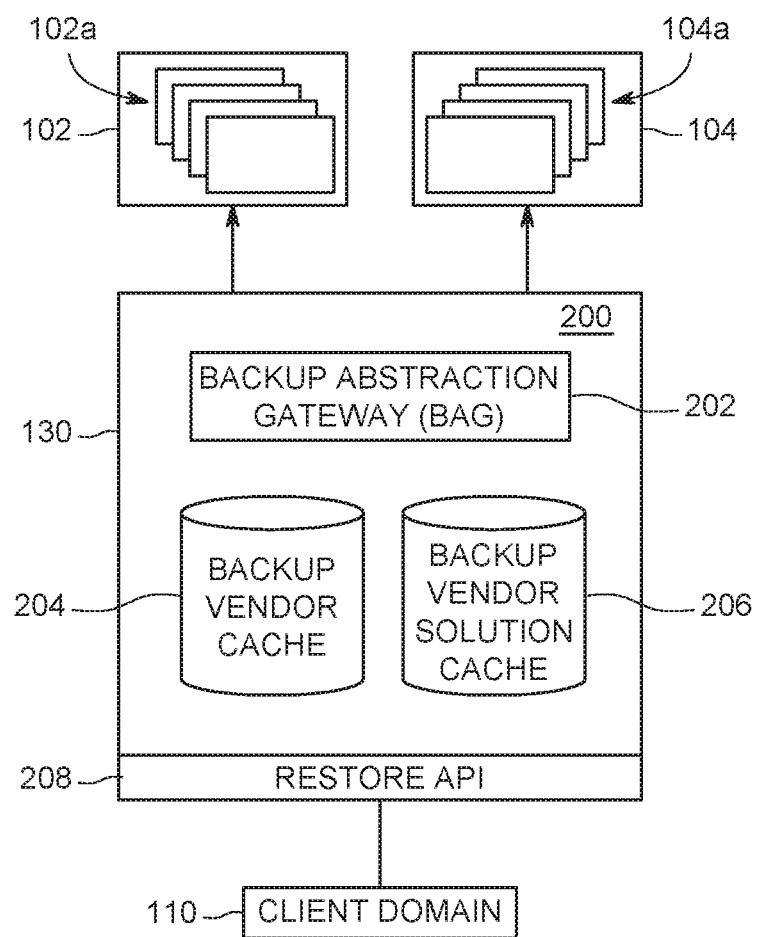
FIG. 2 is a diagram of a cloud-based computing platform including the web-based application for restoring one or more servers used in a client domain, in accordance with an embodiment of the disclosure.

FIG. 2 is a diagram of the cloud-based computing platform 130 including a web-based application 200 for restoring one or more servers used in the client domain 110, in accordance with an embodiment of the disclosure. The web-based application 200 includes a backup abstraction gateway (BAG) 202 that communicates directly with the backup vendors 102, 104 to obtain one or more backups (e.g., a duplicate or clone of data that was present on the servers 102a, 104a prior to the servers 102a, 104a becoming inoperable or corrupted) used for restoring the servers 102a, 104a. Once the BAG 202 obtains the backup sets for the servers 102a, 104a, the BAG 202 stores/manages the backup sets. Particularly, the BAG 202 compiles a listing of the various backup sets for each of the servers 102a, 104a, and stores the compiled listing of backup sets for each backup vendor 102, 104 locally in the cloud-based computing platform 130. For example, as noted above, each of the servers 102a, 104a can have multiple servers and the multiple servers can have their own backup sets. Accordingly, restoring each of the servers 102a, 104a can include using the backup sets for each of the multiple servers of the servers 102a, 104a.

The BAG 202 compiles the listings of backup sets for each backup vendor 102, 104 in one or more data look-up tables using identification (ID) information (e.g., names or other ID information) of all the backup vendors 102, 104 including the servers 102a, 104a that are being managed and their corresponding backup sets to local cache. For illustrative purposes, a list of backup vendors 102, 104 and their corresponding servers 102a, 104a are shown stored in a backup vender cache 204, and a list of corresponding backup vendor solutions are shown stored in a backup vendor solution cache 206. The information contained in the backup vendor cache 204 and the backup vendor solution cache 206 can be also stored in the storage 132 for access thereof by a user via the user interface provided at the client domain 110 (e.g., at the client server 114 and/or the client machines 112), to view, remove, or make changes to the information contained therein.

After the BAG 202 compiles the backup sets for each backup vendor 102, 104, the BAG 202 maintains communication with the backup vendors 102, 104 to obtain updates, if available, for the stored backup sets for each of the backup vendors 102, 104. For example, the BAG 202 can query the backup vendors 102, 104 at a predetermined polling or time interval, which can be set by a user, or a factory default setting can be used. For example, the user can set the BAG 202 to use a polling interval of 1, 5, 10, minutes (or seconds, hours, days, weeks, etc.), or other suitable polling interval, to ensure that the backup sets for the servers 102a, 104a of the backup vendors 102, 104 are up to date. The times at which the updates for the backup are performed by the BAG 202 for the backup vendors 102, 104 can be the same or different. For example, the BAG 202 can update the backup sets for the backup vendor 102 at a first polling/time interval and can update the backup sets for the backup vendor 104 at a second polling/time interval that is different from the first polling/time interval. A user can adjust/change a polling/time interval at which the BAG 202 performs the scheduled updates using the user interface at the client machines 112.

The BAG 202 can store information relating to a previous restore of the servers 102a, 104a. For example, the information can include a date of a previous restore of the servers 102a, 104a, a size of a previous restore of the servers 102a, 104a, an outcome of a previous restore of the servers 102a, 104a (e.g., whether the previous restore of the servers 102a, 104a was successful/unsuccessful), a type of restore of a previous restore of the servers 102a, 104a (e.g., in-place or out-of-place, as described in greater detail below), and a time required to complete a restore using a backup. The BAG 202 can use the stored information to determine if the servers 102a, 104a comply with one or more predetermined objectives, and can present a compliance status of the servers 102a, 104a to a user, which can then take the necessary steps to rectify any compliance issues.

Additionally, the BAG 202 can also store information relating to a previously restored backup. For example, the information relating to a previously restored backup can include a type of the backup (e.g., whether a backup is incremental, differential, full, application based, is for a VM, is for an operating system, etc.). The information relating to a previously restored backup can further include whether a backup used was successful/unsuccessful, various metadata including, but not limited to a size of the backup, a time required to complete a restoration of a server using the backup, etc.

The BAG 202 can store information relating to network information of the servers 102a, 104a, for example, hostname information of the servers 102a, 104a and configuration/type information of the servers 102a, 104a, e.g., database servers, file servers, sharepoint servers, web servers, etc.

The information relating to previous restores of the servers 102a, 104a, relating to a previously restored backup, and network information of the servers 102a, 104a can be stored in local cache of the BAG 202 or the storage 132.

The BAG 202 communicates with a restore application programming interface (API) 208 of the web-based application 200. The restore API 208 receives a request from the client domain 110 for restoring an inoperable (or corrupted) server(s) (e.g., one or both servers 102a, 104a) and transmits this request to the BAG 202, which, in turn, provides the information stored in the backup vendor cache 204 and the backup vendor solution cache 206 to the restore API 208 so that the restore API 208 can restore the inoperable servers that triggered the request to the restore API 208.

The restore API 208 configures a workload 300 (FIG. 3A) for one or more of business functions including, but no limited to, web-based application service, accounting services, sales systems, public website. Each of these business functions can use one or more of the servers 102a, 104a. Thus, if one or both the servers 102a, 104a become inoperable (or corrupted), the configured workload 300 can be used to restore the servers 102a, 104a. The workload 300 is a compilation of data relating to the servers 102a, 104a including, but not limited to, data relating to external requirements of the servers 102a, 104a, pre-restore scripts that can be executed prior to restoring the servers 102a, 104a, post-restore scripts that can be executed subsequent to restoring the servers 102a, 104a, data relating to relating whether manual intervention is required before, during, and/or after restoration of the servers 102a, 104a, or other suitable data that the restore API 208 can used to restore the servers 102a, 104a. The data included in the configured workload 300 can be provided by and/or to a user using a GUI at the client machines 112, as described in more detail below. For example, a user can provide the restore API 208 with information relating to the servers 102a, 104a, and the restore API 208 can use this information to configure the workload 300.

Figure 3A:
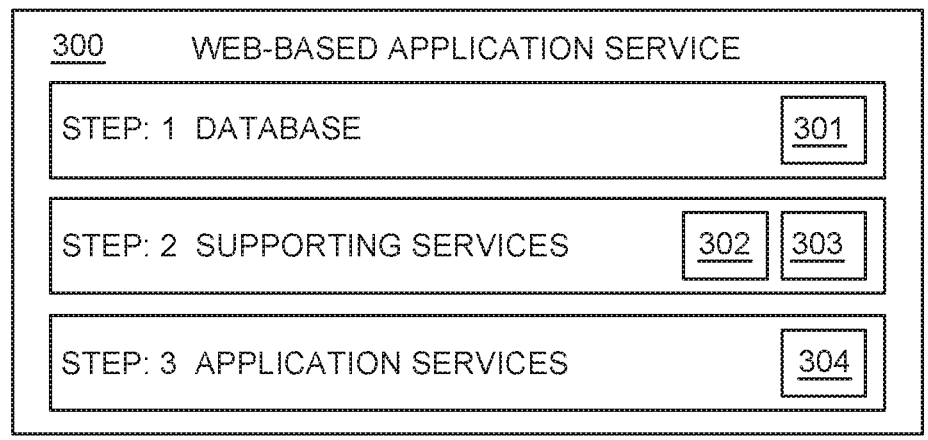
FIG. 3A is a diagram of a workload used by the web-based application for restoring one or more servers used in a client domain, in accordance with an embodiment of the disclosure.

Continuing with reference to FIG. 3A, for example, based on a user input the restore API 208 generates steps for the workload 300, and the generated steps specify servers associated with each of the generated steps. For example, if the workload 300 were for a web-based application service (as shown in FIG. 3A), the workload 300 can include four servers including a database server 301, a file server 302, a sharepoint server 303, and a web server 304, which can be categorized among one or more steps; three steps are shown FIG. 3A. Depending on a type of the workload 300, more or fewer steps and/or servers can be used. For example, if workload 300 were a finance-based service, the workload 300 can include three servers including a database server, a finance file server, and a finance server that can be categorized between two steps.

While the generated workload 300 has been described herein as including multiple steps and/or servers, the present disclosure is not so limited. For example, the generated workload 300 can include a single step including a corresponding single server.

Figure 3B:
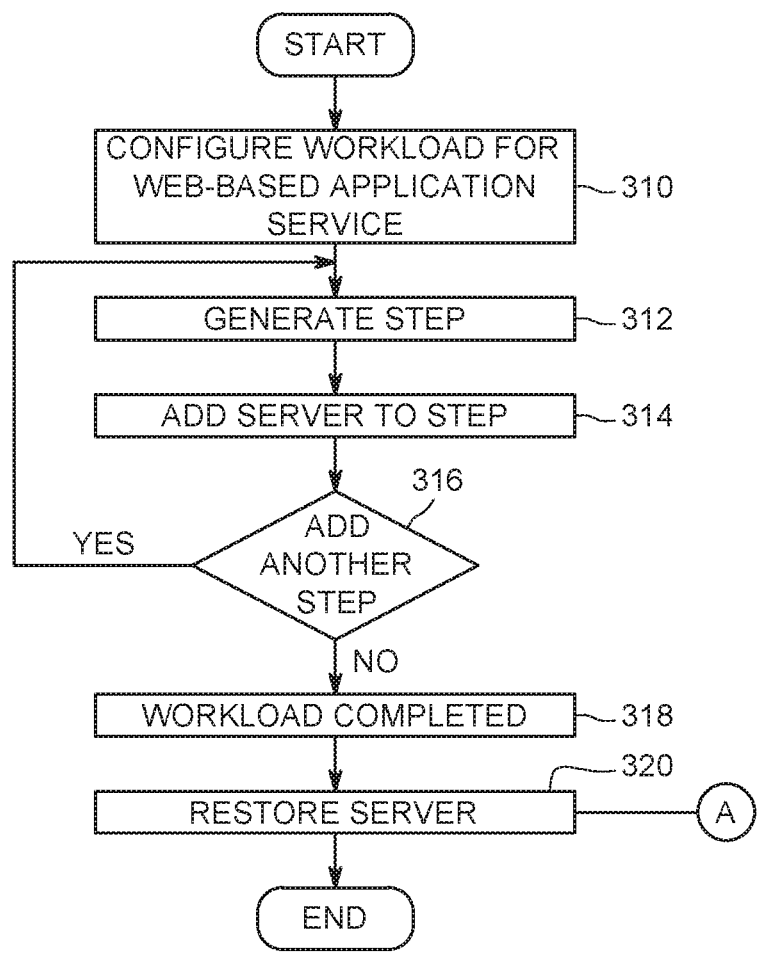
FIG. 3B is a flowchart of a method for configuring a workload.

FIG. 3B is a flowchart of a method for configuring the workload 300. In FIG. 3A, the workload 300 is configured with a first step (step one) that can be a database step, which can include the database server 301, a second step (step two) that can be a supporting services step, which can include the servers 302, 303, and a third step (step three) that can be an application services step, which can include the server 304.

The order in which the restore API 208 configures the steps 1-3 for restoring the respective servers 301-304 can vary depending on one or more parameters, e.g., a priority/importance of the servers 301-304 (e.g., whether the server 301 needs to be restored before the servers 302, 303 can be restored, whether user/manual intervention is required to restore the servers 301-304, a type of the restoration (in-place or out-of-place) of the servers 301-304, external requirements of the servers 301-304, etc.

Continuing with reference to FIG. 3B, at 310 the restore API 208 generates one or more steps at 312. For example, the restore API 208 generates the step one, e.g., the database step, and adds all the servers that should be categorized in the step one, e.g., the server 302, at 314.

At 316, the restore API 208 determines if more steps are needed to configure the workload 300. If yes at 316, the restore API 208 loops back to 312 and continues performing 312-316 until there are no more steps/servers to be generated/categorized, e.g., generates steps two and three and categorizes their respective servers 302-304. If no at 316, at 318, the workload 300 is completed.

Once the workload 300 is configured, the restore API 208 stores the configured workload 300 in the backup vendor solution cache 206 of the BAG 202. Accordingly, if one or more of the servers 301-304 used by the web-based application (for which the workload 300 was configured for)

should fail or become corrupted, the restore API 208 can retrieve the workload 300 and use it to restore the servers 301-304 included therein.

More particularly, the restore API 208 can request the BAG 202 to provide the most recent restored backup for the servers 301-304 stored in the backup vendor solution cache 206 and can restore the inoperable servers 301-304 using the provided backup from the BAG 202.

The restore API 208 can also retrieve information relating to external requirements, if any, needed to restore the servers 301-304. For example, with respect to the server 302, which is illustrated as a file server in FIG. 3A, access to one or more networks (e.g., a user network and a database network) and access to one or more network file systems (NFS) may be needed to restore the server 302 of the workload 300. The information relating to the external requirements for the server 302 can be retrieved by the BAG 202 and stored, for example, in the storage 132 (or the local cache), and accessed by the restore API 208 when the restore API 208 is generating the workload 300.

The restore API 208 can restore the servers 301-304 associated with the web-based application service in-place or out-of-place. As used herein, in-place refers to restoring a server that is inoperable due to corruption or deletion of data and includes restoring that server to a particular point in time using a corresponding backup. For example, if the server 301 becomes corrupted, the server 301 is subsequently restored using a previously restored backup for server 301 (and/or the servers 302-304 if needed). Conversely, out-of-place refers to restoring a server that is inoperable due to destruction (e.g., fire), and includes restoring a different server to a particular point in time using a corresponding backup for the destroyed server. For example, if a first server 301 is destroyed, a second server 301 is updated (i.e., restored) using a previously restored backup for the first server 301.

The restore API 208 can use the stored backup sets to restore an inoperable one of the servers 301-304 to an environment corresponding to a particular date and time. For example, the servers 301-304 can be restored to a first date and time (e.g., using a backup set that was obtained a day ago from the backup vendor 102, or the servers 301-304 can be restored to a second date and time (e.g., using a backup set that was obtained from the backup vendor 104 a week ago).

Moreover, each individual one of the servers of the servers 301-304 can be restored to an environment corresponding to a particular date and time. For example, the server 301 categorized in step one of the workload 300 can be restored to a first date and time, the server 302 categorized in step two of the workload 300 can be restored to a second date and time, the server 303 also categorized in step two of the workload 300 can be restored to a third date and time, and the server 304 categorized in step three of the workload 300 can be restored to a fourth date and time.

Thus, when the workload 300 needs to be restored, the restore API 208 can restore the workload 300 (e.g., the servers 301-304) to the particular date and time, e.g., a day ago. For example, the restore API 208 can restore the servers 301-304 to a date and time that is compatible for all of the servers 301-304 and the backup sets used for restoring each of the servers 301-304 will correspond to that particular date and time, or as close to that particular date and time as possible. For example, if the server 301 became corrupted because of ransomware dating back eight hours ago, restoring the server 301 with a most recent updated backup (e.g., a backup from four hours ago) would not prove advantageous as the server 301 would be restored with the backup including the ransomware. Similarly, if the server 302 were destroyed in a fire, the server 302 may need be restored using the most recent backup. Accordingly, the restore API 208 can restore the servers 301, 302 to a date and time that is compatible for both the servers 301, 302, e.g., using a backup updated more than eight hours ago.

Figure 3C:
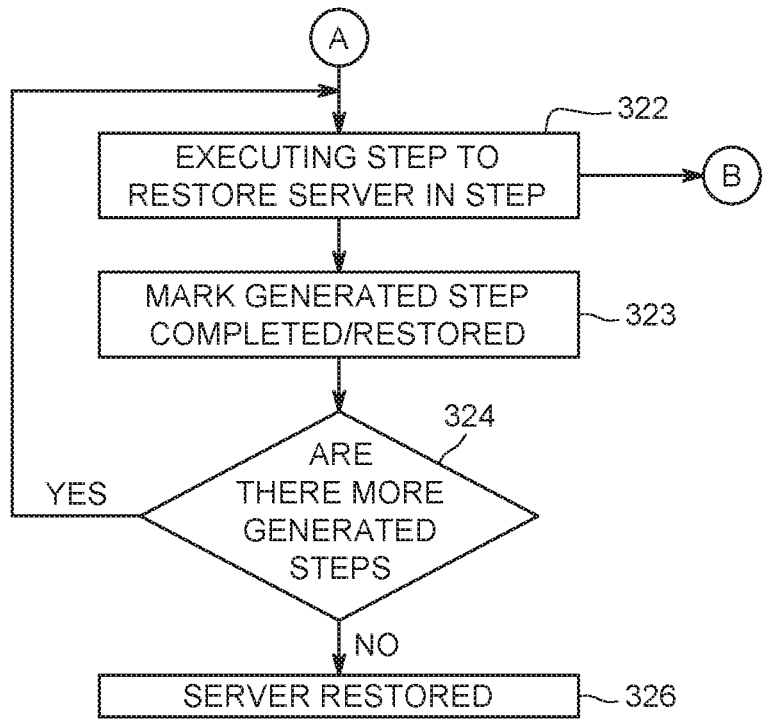
FIG. 3C is a method for executing the steps in the workload of FIG. 3B.
Figure 3C:
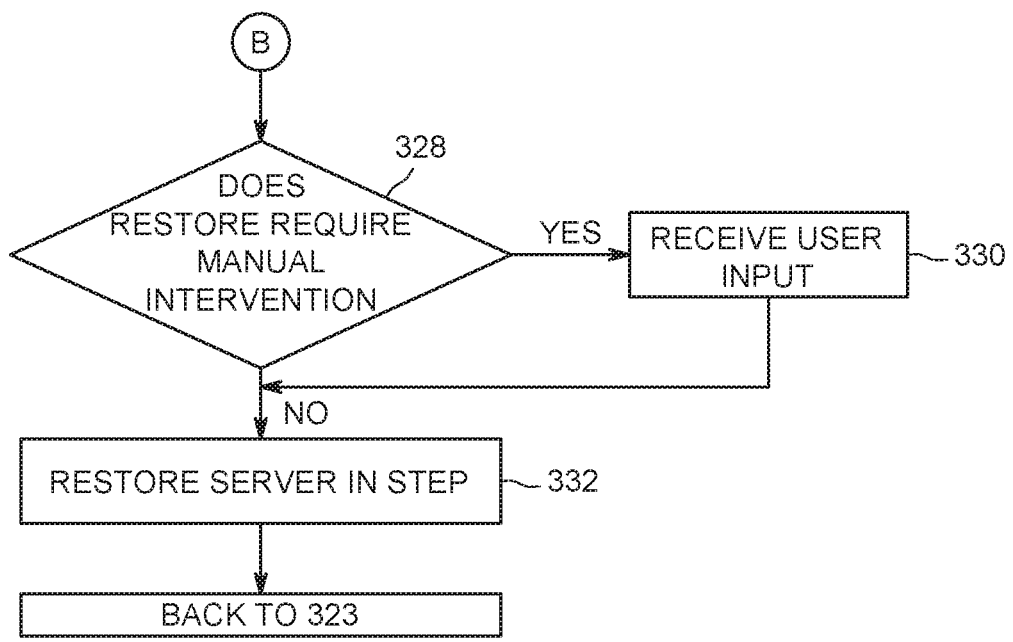

FIG. 3C is a method for executing the steps of the workload 300, in accordance with an embodiment of the disclosure. It is assumed that all functions performed by the web-based application 200 are controlled by the cloud server 134.

Initially, the domain server 114 transmits a request to the restore API 208, and the BAG 202 begins receiving the backup sets for the backup vendors 102, 104 being used locally at the client machines 112; the information can include the names of the servers (e.g., servers 301-304) associated with the backup vendors 102, 104. The BAG 202 complies a list of the backup vendors 102, 104 and their corresponding servers 301-304 and the backup sets of the backup vendors 102, 104, and stores the compilation in the backup vendor cache 204 and in the backup vendor solution cache 206, as described above. Once the requisite information is provided to the BAG 202, the BAG 202 manages the various backup sets of the backup vendors 102, 104 and uses the managed backup sets to restore the servers 301*a*-304*a* and 301*b*-303*b*, if one should become inoperable.

For example, the BAG 202 requests, at one or more of the above-described polling intervals, that the backup vendors 102, 104 provide updates relating to the backup sets for the servers 301-304. In response to the request, the BAG 202 receives the updated backup sets for the corresponding servers 301-304 from the backup vendors 102, 104. The received updated backup sets for the corresponding servers 301-304 are stored in the backup vendor solution cache 206 and replace the previous restored backups for the corresponding servers 301-304. The previous restored backups for the servers 301-304 can be stored in the storage 132 for viewing by a user at the client domain 110, or can be simply deleted. In the former instance, the BAG 202 can store any number of previous restored backups for the servers 301-304. For example, the BAG 202 can store 1, 2, 3, 4, and so on of previously stored backup sets for the servers 301-304; the number of previously restored backups that the BAG 202 stores can depend on a user setting, storage capabilities of the storage 132, a manufacturer's preference, etc.

If the servers 301-304 should become inoperable (e.g., in-place or out-of-place), a failure indication is generated locally at the domain server 114 of the domain 110 and transmitted to and received at the restore API 208; generation/transmission of the failure indication can be performed automatically or manually—depending on a specific configuration of the web-based application 200, a particular reason that a server fails, etc. For example, failure of one or all the servers 301-304 can automatically trigger the domain server 114 to generate the failure indication and transmit the failure indication to the restore API 208. Conversely, if the failure indication is sent manually (e.g., by a user) to the restore API 208, a user interface, such as the graphical user interface (GUI) described below, can be provided at the client domain 110 (e.g., at the client machines 112) and used to receive a user input for requesting a manual restore of one of the inoperable servers 301-304 from the restore API 208.

For illustrative purposes, it is assumed that the failure indication was transmitted automatically for the servers 301-304 (e.g., associated with the web-based application service of FIG. 3A) which have become inoperable and need to be restored in-place.

Accordingly, upon receiving the failure indication at the restore API 208, the restore API 208 begins restoring the servers 301-304 using the previously configured and stored workload 300 at 310, 320, respectively.

For example, the most recent backup sets for the servers 301-304 can include information relating to the data that was present on the server 301-304 prior to the servers 301-304 becoming inoperable, and/or any information relating to any external requirements. Accordingly, the restore API 208 uses the received backup sets from the BAG 202 and restores each of the servers 301-304 in each of the generated steps one-three.

The way the servers 301-304 are restored in each of the generated steps one-three can depend on, for example, the number of steps that were generated to configure the workload, the number of servers categorized for each step, whether user input is needed, etc.

For example, when the workload 300 is configured as shown in FIGS. 3A and 3B, the restore API 208 can first restore the server 301 in the generated step one using the most recently updated backup for the server 301 (or another backup) provided by the BAG 202 at 322. After the server 301 is restored, the restore API 208 can mark step one as completed/restored at 323; this operation, however, is optional, but can be helpful if manual intervention is required during a restoration process of a server or if manual restoration of a server is being performed, as described in more detail below.

Thereafter, at 324 the restore API 208 determines if there are more generated steps. If yes at 324, such as in FIG. 3A, the restore API 208 continues sequentially executing the steps so that the servers categorized in the remaining steps can be restored. For example, since the configured workload 300 has three steps one-three, after the determination yes at 324, the restore API 208 executes step two and restores the servers 302, 303. When two or more servers are categorized in a step, such as in step two, the restore API 208 can restore each server 302 and 303 parallelly (e.g., restore both the servers 302, 303 prior to executing the step three) using the corresponding most recently updated backup for the servers 302, 303 (or other backup) provided by the BAG 202. After the servers 302, 303 in step two are restored, the step two can be marked as completed/restored. Subsequently, the restore API 208, loops back to 322, and then restores the server 304 in the step three using the most recently updated backup (or another backup) for the server 304 provided by the BAG 202. A determination no at 324 indicates that restoration of the servers 301-304 is completed, and all the servers 301-304 can be marked restored at 326.

When performing 322-324, i.e., executing the steps one-three, the restore API 208 may be configured to determine if manual intervention is required before executing a next step, e.g., prior to marking a step as completed/restored at 323. For example, during execution of step one, at 328 the restore API 208 may determine if manual intervention is required to continue with the restoration of the server 301 (e.g., if a backup other than the most recently updated backup is to be used for restoring the server 301). If no at 328, the restore API 208 restores the server 301 at 332 and then goes back to 323. If yes at 328, at 330 a user is requested to input the required information to the restore API 208; the restore API 208 can mark the step one as incomplete until the required information is provided/inputted to the restore API 208 at 330. After the required information is inputted at 330, the restore API 208 restores the server 301 at 332 and then goes back to 323, as described above.

Similarly, the restore API 208 may be configured to automatically pause prior to executing a subsequent step. For example, after the server 301 of step one is restored, prior to the restore API 208 executing the step two at 322, at 328 the restore API 208 may be configured to automatically query a user for information relating to the servers 302, 303 in the step two (e.g., information relating to a restore out-of-place or if a backup other than the most recently updated backup is to be used for the servers 301, 302). The user can provide/input the requested information to the restore API 208 at 330, which can then restore the servers 302, 303 and can proceed back to 323, as described above.

Figure 5:
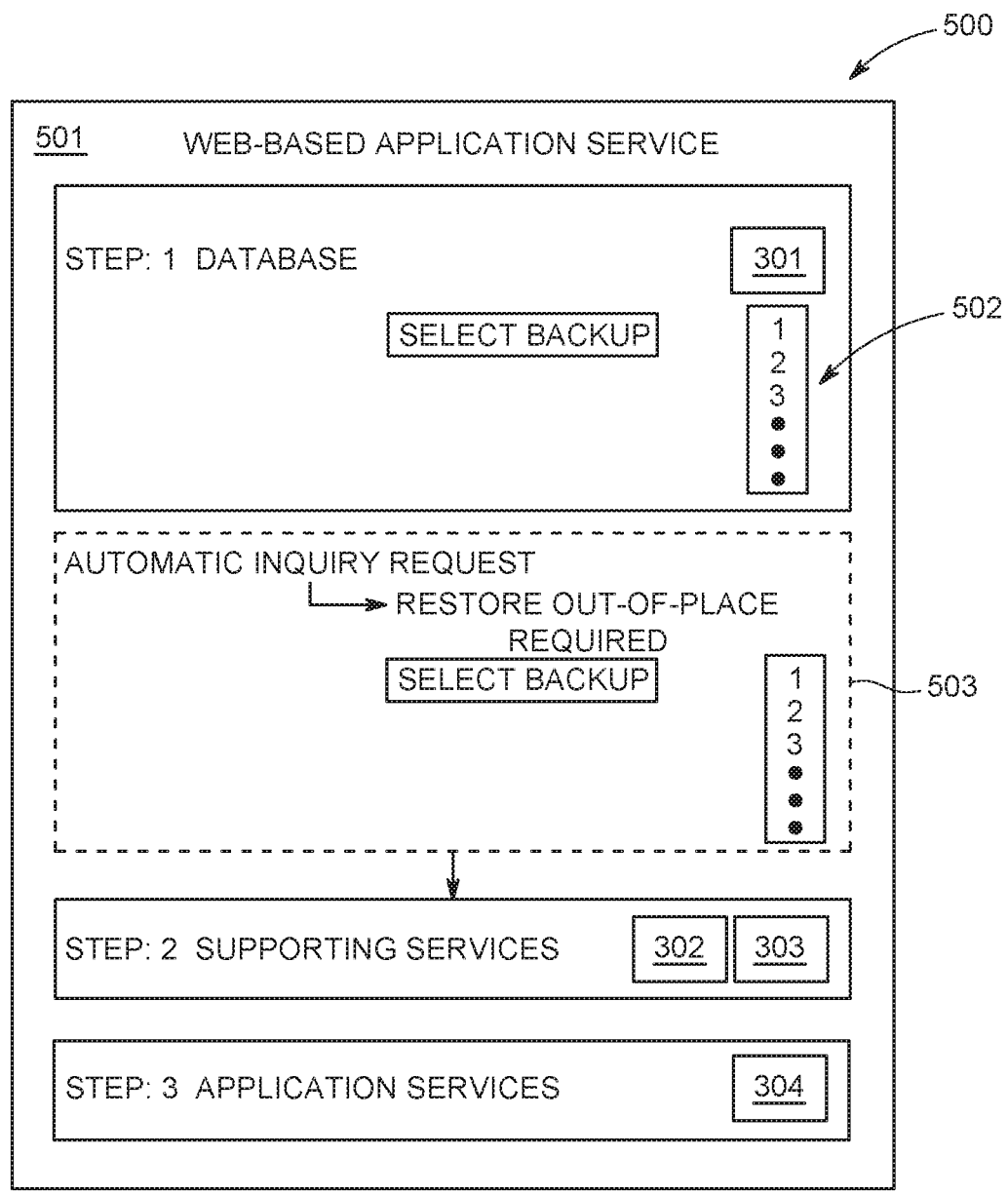
FIG. 5 is a diagram of a graphical user interface, in accordance with an embodiment of the disclosure.

The restore API 208 can provide one or more GUIs when manual intervention is required at 330 (i.e., a yes at 328) for restoring one or more of the servers 301-304. The restore API 208 can, for example, provide a user with one or more types of GUIs which can be displayed on a display of the client machines 112. For example, a GUI 500 (FIG. 5) can include the information used to configure the workload 300 of FIG. 3A and can include any one of labels, text fields, buttons, text area, checkboxes, radio buttons, drop-down lists, etc. For illustrative purposes, the GUI 500 is shown including a text area 501 including an ID of the inoperable server (e.g., server 301) and a listing of the generated steps one-three. Each listing of the steps one-three can include a drop-down list 502 including a listing of the stored backup sets (including the most recently updated backup, which will be shown as the first backup) for the inoperable server, which can be selected by a user for restoring the inoperable server. Also, when the restore API 208 is configured to automatically pause after a step is completed, e.g., (yes at 328) after the step one is completed and prior to executing the step two, the GUI 500 can include an automatic inquiry request tab 503 (shown in phantom) for receiving user information. For example, if the restore API 208 is performing an out-of-place restore, a user may be requested to select a backup other than the most recently updated backup.

A system 100 that uses the methods described herein can restore inoperable servers in a relatively quick manner, when compared to conventional methods used to restore inoperable servers. More particularly, since the stored/updated backup sets for corresponding backup vendors are readily available at the BAG 202, the restore API 208 is not required to query each individual backup vendor for the most recent backup when a server becomes inoperable. Moreover, the BAG 202 allows a user to track changes in the backup information in a common manner regardless of the backup solution(s). Furthermore, since the information provided in the workload 300 is created and stored in the BAG 202 (e.g., prior to a disaster occurring), the information contained in the workload 300 can be used by the restore API 208, with minimal user intervention, to restore corresponding servers associated with one or more function-based services in a relatively quick and easy manner at a client machine.

Figure 4:
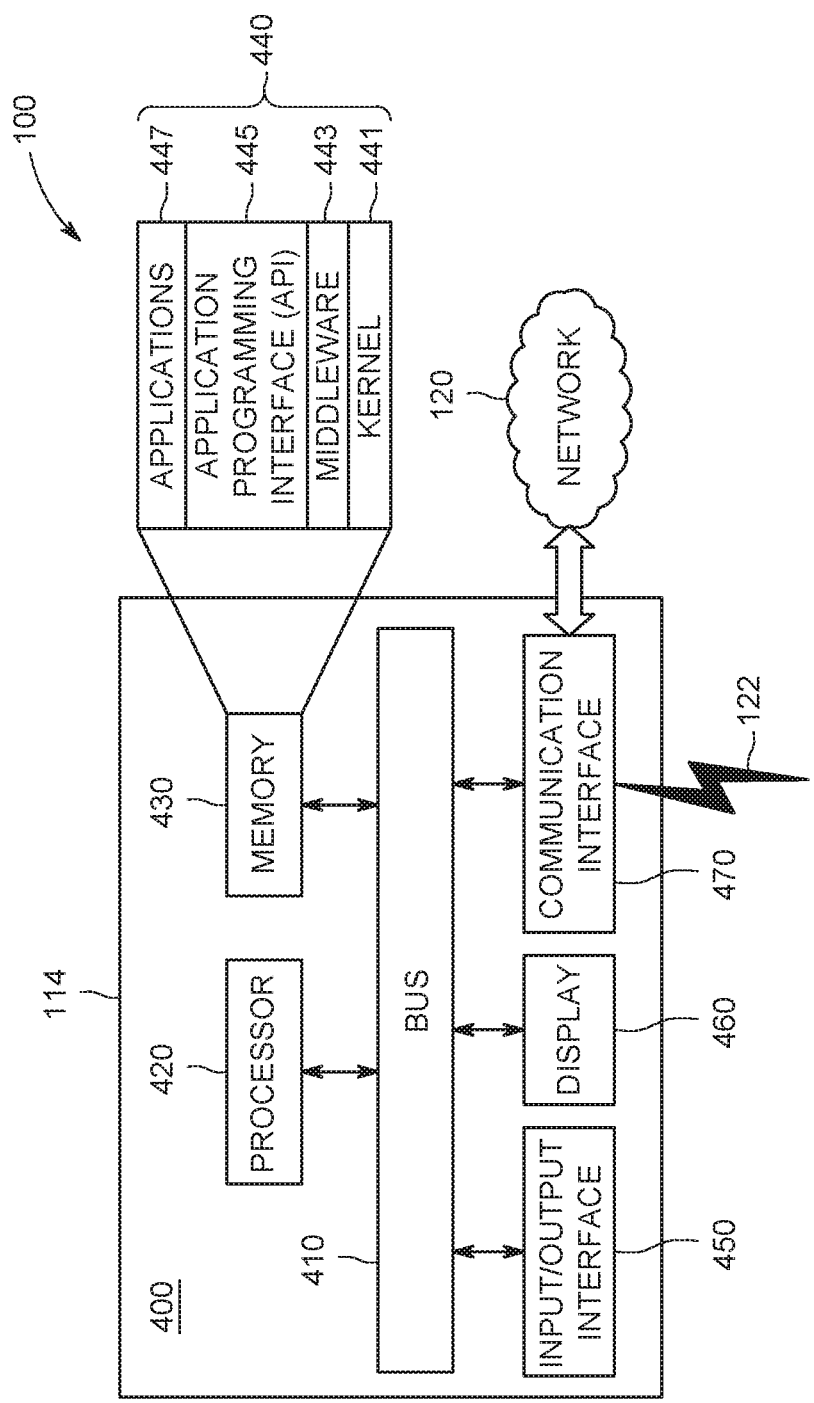
FIG. 4 is a diagram of an electronic device, in accordance with an embodiment of the disclosure.

FIG. 4 is a diagram of an electronic device, in accordance with an embodiment of the disclosure. The electronic device performs the above-described functions and processes of the client server 114 and/or the cloud server 134.

The electronic device 400 includes a bus 410, a processor or controller 420, a memory 430 (or storage, e.g., the storage 132), an input/output interface 450, a display 460, and a communication interface 470. At least one of the above-described components may be omitted from the electronic device 400 or another component may be further included in the electronic device 400.

The bus 410 may be a circuit connecting the above-described components 420, 430, 450, 460, and 470 and transmitting communications (e.g., control messages and/or data) between the above-described components.

The processor 420 may include one or more of a central processing unit (CPU), an application processor (AP), and a communication processor (CP). The processor 420 controls at least one of the other components of the electronic device 400 and/or processing data or operations related to communication.

The memory 430 may include volatile memory and/or non-volatile memory. The memory 430 stores data or commands/instructions related to at least one of the other components of the electronic device 400. The memory 430 stores software and/or a program module 440 (e.g., web-based application 200). For example, the program 440 may include a kernel 441, middleware 443, an API 445 (e.g., a restore API 208), application programs 447 (or applications, e.g., web-based application 200). The kernel 441, the middleware 443 or at least part of the API 445 may be called an operating system.

The kernel 441 controls or manages system resources (e.g., the bus 410, the processor 420, the memory 430, etc.) used to execute operations or functions of other programs (e.g., the middleware 443, the API 445, and the applications 447). The kernel 441 provides an interface capable of allowing the middleware 443, the API 445, and the applications 447 to access and control/manage the individual components of the electronic device 400.

The middleware 443 may be an interface between the API 445 or the applications 447 and the kernel 441 so that the API 445 or the applications 447 can communicate with the kernel 441 and exchange data therewith. The middleware 443 is capable of processing one or more task requests received from the applications 447. The middleware 443 assigns a priority for use of system resources of the electronic device 400 (e.g., the bus 410, the processor 420, the memory 430, etc.) to the application 447. The middleware 443 processes one or more task requests according to a priority assigned to at least one application program, thereby performing scheduling or load balancing for the task requests. For example, in the event of one of the servers 102a, 104a (301-304) becoming inoperable, the middleware 443 can assign a high priority for the tasks required to restore the servers 102a, 104a (301-304) to an operation state.

The API 445 may be an interface that is configured to allow the applications 447 to control functions provided by the kernel 441 or the middleware 443. The API 445 may include at least one interface or function (e.g., instructions) for file control, window control, image process, text control, or the like. For example, during a restore operation, the API 445 allows the applications 447 to display one or more user interfaces that allow a user to navigate through the BAG 202 of web-based application 200 to enter the above-described information associated with the backup vendors 102, 104.

The input/output interface 450 is capable of transferring instructions or data, received from the user or external devices, to one or more components of the electronic device 101. The input/output interface 450 is capable of outputting instructions or data, received from one or more components of the electronic device 400, to the user or external devices. The input/output device 450 can be configured to create one or more GUIs for receiving a user input, as described above.

The display 460 may include a liquid crystal display (LCD), a flexible display, a transparent display, a light emitting diode (LED) display, an organic LED (OLED) display, micro-electro-mechanical systems (MEMS) display, an electronic paper display, etc. The display 460 displays various types of content (e.g., texts, images, videos, icons, symbols, etc.). The display 460 may also be implemented with a touch screen. The display 460 receives touches, gestures, proximity inputs or hovering inputs, via a stylus pen, or a user's body. Accordingly, the display 450 can be used to receive a user input on one or more GUIs, e.g., the GUI 500.

The communication interface 470 establishes communication between the electronic device 400 and an external device (e.g., backup vendors 102, 104) connected to the network 120 via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 122. Short-wireless communication 122 may include at least one of wireless fidelity (Wi-Fi), Bluetooth (BT), near field communication (NFC), magnetic secure transmission (MST), etc. Wired communication may include at least one of universal serial bus (USB), high definition multimedia interface (HDMI), recommended standard 232 (RS-232), and plain old telephone service (POTS). The network 120 may include at least one of a telecommunications network, e.g., a computer network (e.g., local area network (LAN) or WAN), the Internet, and a telephone network.

While the domain server 114 and the cloud server 134 have been described herein as communicating with the backup vendors 102, 104 over the network 120, the disclosure is not so limited. For example, one or both the domain server 114 and the cloud server 134 can communicate with each other and/or the backup vendors 102, 104 over the short-wireless communication 122.

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

Furthermore, while the methods described herein have been described for use with the cloud-based computing platform 130, the disclosure is not so limited. For example, the methods described herein can be performed locally using the client server 114 in the client domain 110. Additionally, one or more of the sequences in the methods described herein can be omitted, or one or more sequences not herein described can be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for cloud-based disaster recovery, the method comprising:
configuring, at a cloud-based computing platform, a workload associated with a function-based service used by a client machine;
determining, at the cloud-based computing platform, servers associated with the workload based on information provided by a user;
generating steps for the workload;
categorizing the determined servers into the generated steps;
storing the workload;
restoring the servers using the stored workload upon receiving a failure indication from the client machine; and
determining whether a user input is required to complete restoration of at least one of the servers for each of the generated steps, wherein the user input relates to at least one of a type of restoration or whether a backup other than a most recently updated backup is to be used for restoring the at least one server.

2. The method of claim 1, wherein determining servers comprises determining requirements for each of the servers.

3. The method of claim 2, wherein the requirements for each of the servers comprises at least one of access to a network including at least one of a user network and a database network and a network file system share.

4. The method of claim 1, wherein the servers are at least one of a file server, a sharepoint server, and a database server.

5. The method of claim 1, wherein restoring the servers is performed sequentially for each of the generated steps.

6. The method of claim 1, wherein if it is determined that the user input is required, the method further comprises providing a graphical user interface at the client machine for receiving the user input.

7. A nontransitory computer readable storage medium having stored thereon instructions that when executed by a processor perform a method for cloud-based disaster recovery, the method comprising:
configuring, at a cloud-based computing platform, a workload associated with a function-based service used by a client machine;
determining, at the cloud-based computing platform, servers associated with the workload based on information provided by a user;
generating steps for the workload;
categorizing the determined servers into the generated steps;
storing the workload;
restoring the servers using the stored workload upon receiving a failure indication from the client machine; and
determining whether a user input is required to complete restoration of at least one of the servers for each of the generated steps, wherein the user input relates to at least one of a type of restoration or whether a backup other than a most recently updated backup is to be used for restoring the at least one server.

8. The nontransitory computer readable storage medium of claim 7, wherein determining servers comprises determining requirements for each of the servers.

9. The nontransitory computer readable storage medium of claim 8, wherein the requirements for each of the servers comprises at least one of access to a network including at least one of a user network and a database network and a network file system share.

10. The nontransitory computer readable storage medium of claim 7, wherein the servers are at least one of a file server, a sharepoint server, and a database server.

11. The nontransitory computer readable storage medium of claim 7, wherein restoring the servers is performed sequentially for each of the generated steps.

12. The nontransitory computer readable storage medium of claim 7, wherein if it is determined that the user input is required, the method further comprises providing a graphical user interface at the client machine for receiving the user input.

13. A cloud-based server of a cloud-based computing platform comprising:
a processor; and
a memory coupled to the processor and having stored thereon instructions that when executed by the processor configure the cloud-based server to:
configure, at a cloud-based computing platform, a workload associated with a function-based service used by a client machine;
determine, at the cloud-based computing platform, servers associated with the workload based on information provided by a user;
generate steps for the workload;
categorize the determined servers into the generated steps;
store the workload;
restore the servers using the stored workload upon receiving a failure indication from the client machine; and
determine whether a user input is required to complete restoration of at least one of the servers for each of the generated steps, wherein the user input relates to at least one of a type of restoration or whether a backup other than a most recently updated backup is to be used for restoring the at least one server.

14. The cloud-based server of claim 13, wherein the instructions further configure the cloud-based server to determine requirements for each of the servers.

15. The cloud-based server of claim 14, wherein the requirements for each of the servers comprises at least one of access to a network including at least one of a user network and a database network and a network file system share.

16. The cloud-based server of claim 13, wherein the servers are at least one of a file server, a sharepoint server, and a database server.

17. The cloud-based server of claim 13, wherein restoration of each of the determined servers is performed sequentially for each of the generated steps.

18. The cloud-based server of claim 13, wherein the instructions further configure the cloud-based server to provide a graphical user interface at the client machine for receiving the user input.

* * * * *